UNITED STATES PATENT OFFICE.

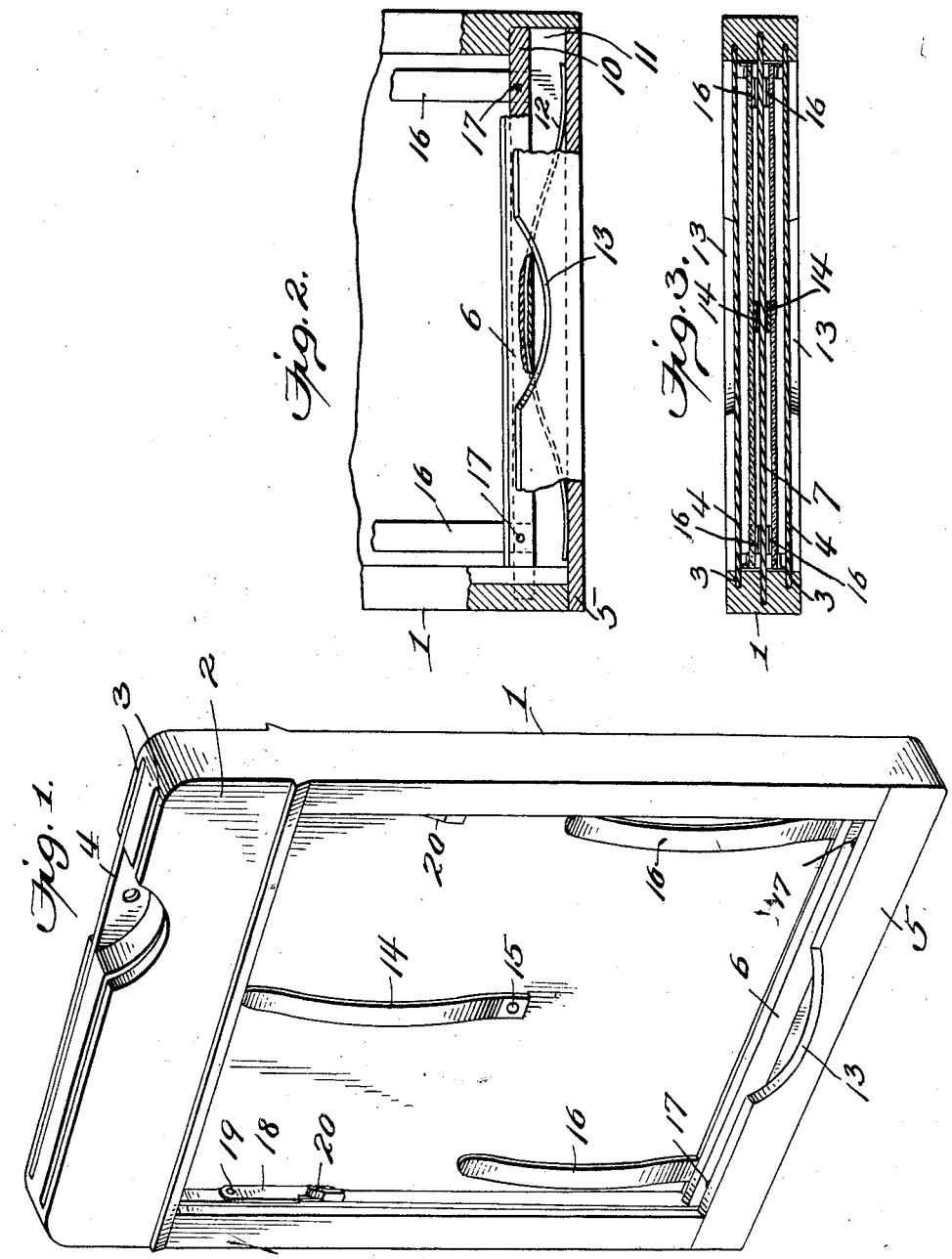

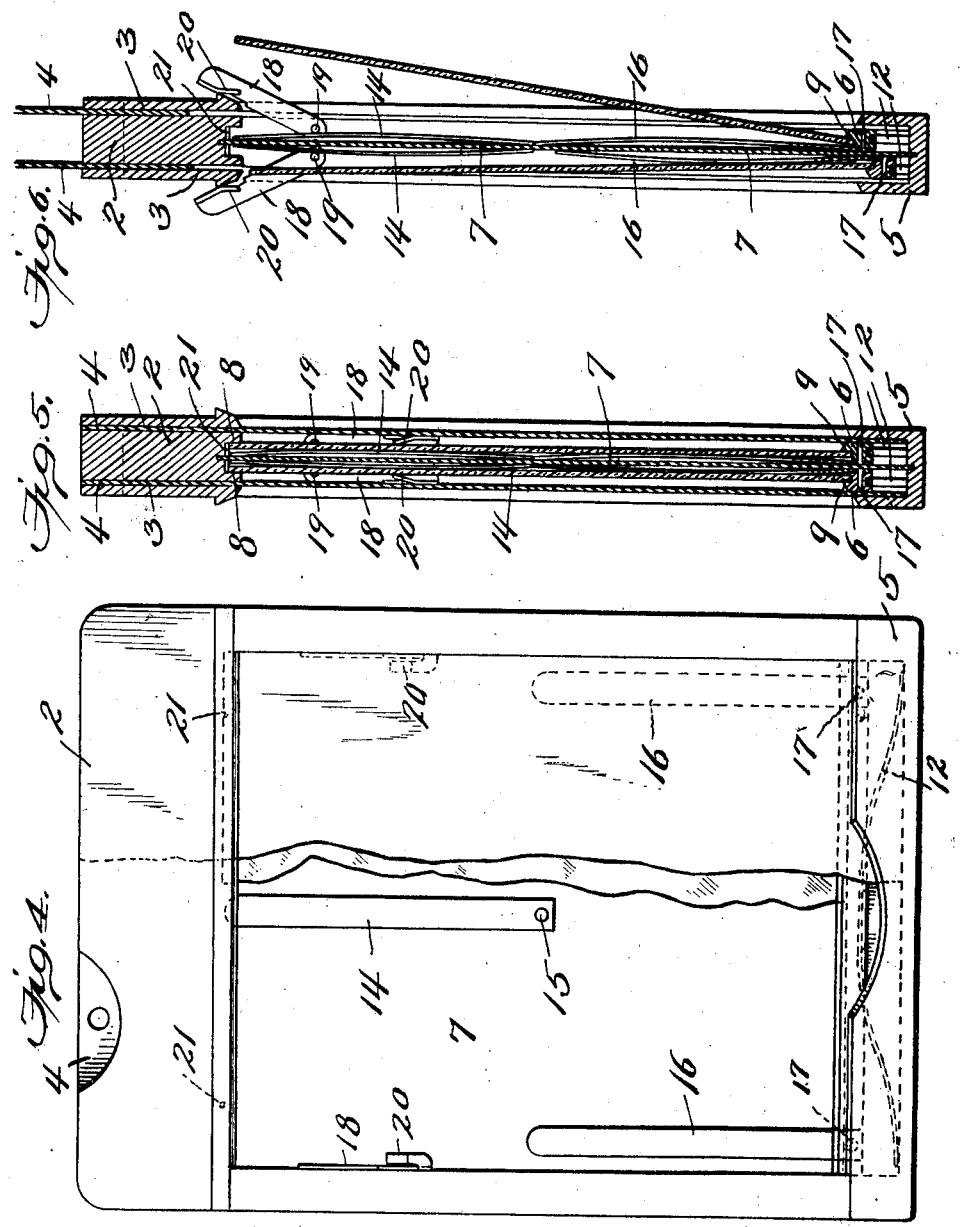

JOSEPH GODDARD, OF ROCHESTER, NEW YORK, ASSIGNOR TO SENECA CAMERA MFG. CO., OF ROCHESTER, NEW YORK, A CORPORATION OF NEW YORK.

PLATE-HOLDER FOR PHOTOGRAPHIC CAMERAS.

1,343,773.   Specification of Letters Patent.   Patented June 15, 1920.

Application filed February 19, 1919. Serial No. 278,035.

*To all whom it may concern:*

Be it known that I, JOSEPH GODDARD, a citizen of the United States, residing at Rochester, in the county of Monroe and State of New York, have invented new and useful Improvements in Plate-Holders for Photographic Cameras, of which the following is a specification.

My invention relates to improvements in plate holders for photographic cameras and the primary object of the invention is to provide novel and improved means for holding the sensitized plate in such position within the plate holder that, when the latter is placed in the camera, the sensitized plate to be exposed will be positioned correctly and accurately in the focus plane of the camera, thus insuring improved photographic results for the reason that all parts of the sensitized plate will be in direct focus as distinguished from plate holders as usually constructed, wherein the sensitized plate is contained loosely within the plate holder and may shift into a position to carry it wholly or partially out of focus with the camera lens. While this improved result is accomplished the operations of loading and unloading the plate holder can be accomplished with the same facility as is the case with ordinary plate holders and furthermore the sensitized plates will not become displaced during the handling of the plate holder.

To this and other ends the invention consists in certain improvements and combinations and arrangements of parts all as hereinafter more fully set forth, the features of novelty being pointed out particularly in the claims.

In the accompanying drawings—

Figure 1 is a perspective view of a photographic plate holder constructed in accordance with the present invention, one of the shutter slides being shown removed from the holder.

Fig. 2 is an elevation partly in section of the lower end of the plate holder as shown in Fig. 1.

Fig. 3 represents a transverse section through the plate holder.

Fig. 4 is a side elevation of the plate holder partly broken away.

Fig. 5 represents a vertical section through the plate holder showing two plates in position therein, and Fig. 6 represents a central section of the plate holder indicating the mode of introducing and removing the plates with respect thereto.

Similar parts are designated by the same reference characters.

The present invention is particularly applicable to plate holders adapted for use in connection with photographic cameras. In the present instance the invention is shown applied to a plate holder of the double type, that is to say one capable of accommodating two sensitized plates. It is to be understood, however, that the invention is not restricted to the particular type of plate holder shown nor is it limited to the precise construction illustrated and that equivalent constructions are contemplated which will be included within the scope of the claims.

In the present instance the plate holder comprises a frame-like structure 1 having an upper member 2 which is provided with slots 3 through which the usual opaque shutter slides 4 operate and the lower rail 5 being recessed to receive the lower ends of the shutter slides and also to accommodate the lower plate retaining rails 6. In the double holder shown a septum 7 is fitted into the frame-like structure of the holder and it divides the holder into two compartments, one at each side of the septum. The upper member 2 of the holder is grooved to form a pair of ledges 8 which extend completely across the holder and the rails 6 are formed with ledges 9 which also extend across the full width of the holder. These upper and lower ledges 8 and 9 respectively are so located that they will determine the focal plane of the respective sensitized plates when the latter are inserted into the holder and bear against these ledges, it being understood that these upper and lower ledges engage the respective plates by overlapping their upper and lower edges. In order to enable the plates to be inserted and removed the rails 6 which carry the lower ledges may be retracted or moved downwardly away from the upper ledges. As shown each lower rail 6 has reduced ends 10 which operate in guiding slots 11 formed in the sides of the holder and a spring 12 is interposed between each of these rails and the bottom of the slot in which the rail operates, the spring acting to move the rail into a position to retain the plate in the holder. Each lower member 5 of the holder is preferably provided with a notch 13 to facilitate retraction of the respective rail 6 by the thumb or finger of the operator.

In plate holders as heretofore constructed the sensitized plates have been retained by upper and lower ledges, but frequently no means were provided for insuring abutment of the upper and lower ends of the plate with the upper and lower ledges, and hence the plates were subject to displacement within the holder to a degree that would throw the upper and lower ends of the plate, of the entire plate, out of focus with the camera lens. The present invention provides means for moving the plate automatically into engagement with the upper and lower ledges and for maintaining the plate in engagement with such ledges. In consequence the plate will be positioned and held exactly in the focus of the camera. The means for accomplishing this result comprises, in the present instance, an intermediate spring 14, one end of which may be fixed at 15 to one side of the septum 7 and preferably a pair of springs 16, which are secured toward their lower ends, as at 17, to the respective rail 6. Leaf springs are preferably used and it is also preferable to use a single intermediate spring 14, located at a suitable point vertically of the plate holder, and a pair of lower springs 18 located toward the side edges of the septum. In a double plate holder, such as that shown, it is to be understood that a set of springs, as described, will be provided for each plate compartment. The spring 14, when the usual size plate is used, performs the function of pressing the upper end of the plate into engagement with its respective upper ledge 8 and holding this end of the plate in such position, and the lower springs 16 perform the function of pressing the lower end of the respective plate into engagement with the lower ledge 9 and retaining this end of the plate in such position. Each plate is inserted into the holder by first engaging the lower end of the plate with the lower ledge 9, while the respective rail 6 is retracted, and then swinging the upper end of the plate into a position to compress the springs 14 and 16 sufficiently to bring the upper end of the plate into a position where it will move into engagement with the respective upper ledge 8. Releasing of the retracting pressure of the finger upon the rail 6 will then permit the spring 12, acting on this rail, to force the plate upwardly, thus engaging the upper end of the plate with the upper ledge. Removal of the plate is effected by retracting the rail 6 sufficiently to free the upper end of the plate from the upper rail, then tilting the upper end of the plate outwardly where it may be gripped and lifted free of the lower ledge 9. By attaching the plate-positioning springs 16 to the rail 6 it has been found that the plate will remain in engagement with the lower ledge 9 when the rail 6 is retracted, thereby facilitating the operation of removing the plate.

In some instances it may be desirable or necessary to provide means for preventing disengagement of the upper ends of the plates from the upper ledges 8, due to jarring of the plate holder to an extent that would retract the rails 6. In such cases a pair of plate retaining members 18 may be pivoted at 19 to the respective side members of the plate holder, there being a pair of these retaining members for each plate compartment of the holder, each plate retaining member having an inturned lug 20 which is adapted to over-lie the respective side edge of the plate when the latter is in position in the holder and the plate retaining member is swung inwardly to its operative position. These plate-engaging lugs 20 in turn will be engaged by the respective shutter slide 4 when the latter is inserted and the plate retaining members will be thereby held in their operative positions, as shown in Fig. 5. While the plate retaining members are in such position the upper end of the sensitized plate is prevented from disengaging from the upper ledge 8 under the influence of the upper spring 14, even though the rail 6 may become accidentally retracted to a point that would carry the upper edge of the plate below the ledge 8. Where these plate retaining members are used, the operations of inserting and removing the sensitized plates is the same, as previously described, it being understood that these members 18 are swung outwardly and upwardly from the respective plate compartments until they lie against the top member 2 of the shutter frame, as shown in Fig. 6, preparatory to the insertion or removal of a plate, thus enabling the plate to be inserted and removed without being obstructed by the plate retaining members. The inturned lugs 20 of the plate retaining members are preferably beveled toward their upper ends, as shown, in order to permit the respective shutter slides 4 to engage and pass these lugs without catching thereon.

In order to prevent binding of the upper edge of the plate against the upper member 2 of the holder, under the influence of the rail actuating spring 12, one or more pins 21 may be fitted into the upper member 2 to engage the upper edges of the plates. These pins, when used, will prevent biting of the upper edges of the plates into the upper rail 2 and hence the upper springs 14 will operate with certainty in forcing the upper ends of the plates into engagement with the upper ledges.

I claim as my invention—

1. A photographic plate holder comprising a plate compartment, upper and lower ledges adapted to overlap the upper and lower ends of a sensitized plate and thus position the plate, one of said ledges being retractile, and a spring movable with said retractile ledge and operative on one of the surfaces of the sensitized plate to press the sensitized plate against the retractile ledge.

2. A plate holder of photographic cameras comprising a compartment for a sensitized plate, oppositely positioned ledges adapted to overlap opposite edges of the plate, one of said ledges being movable toward and from the other ledge, and springs operative to press the plate against the ledges, certain of said springs being movable with said movable ledge and resiliently engageable with one of the surfaces of the plate to cause the plate to maintain its engagement with the movable ledge when the latter is retracted.

3. A photographic plate holder comprising a plate compartment, oppositely located ledges adapted to overlap opposite edges of a plate in said compartment, one of said ledges being movable toward and from the other ledge, and means carried by the movable ledge and operative frictionally on one of the surfaces of the plate to press the respective edge of the plate into engagement with such ledge.

4. A photographic plate holder comprising a plate compartment, oppositely located ledges adapted to overlap opposite edges of a plate in said compartment, one of said ledges being retractile relatively to the other ledge, a relatively fixed spring operative to press a plate in said compartment into engagement with one of said ledges, and a spring carried by the retractile ledge and operative resiliently on one of the surfaces of the plate to press the plate into engagement with the retractile ledge during retraction of said ledge.

5. A photographic plate holder comprising a plate compartment, oppositely located ledges adapted to overlap opposite edges of a plate in such compartment, one of said ledges being retractile relatively to the other ledge, spring means acting to press the plate against said ledges, plate retaining members having portions arranged to engage the plate, and a shutter slide arranged to engage the plate retaining members and thus hold such members in position to sustain the pressure exerted on the plate by said spring means.

6. In a photographic plate holder having a plate compartment, a shutter slide, and oppositely located relatively retractile ledges to overlap a plate in said compartment, spring means operative to press a plate in the compartment outwardly and into engagement with said ledges, and members for preventing dislocation of the plate when said ledges are relatively retracted, said members being pivoted at opposite edges of the compartment and having inturned lugs to overlie the plate and to also abut against the inner side of the shutter slide.

In testimony whereof I have hereunto set my hand in presence of two subscribing witnesses.

JOSEPH GODDARD.

Witnesses:
 ANNA K. BRIMACOMBE,
 ANGELA M. BUCK.